United States Patent
Todorovic

(10) Patent No.: US 8,833,515 B2
(45) Date of Patent: Sep. 16, 2014

(54) METHOD FOR THE PRODUCTION OF A SOUND ABSORBER, ESPECIALLY FOR A GAS TURBINE EXHAUST CONE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/979,809

(22) PCT Filed: Jan. 19, 2012

(86) PCT No.: PCT/EP2012/000244
§ 371 (c)(1),
(2), (4) Date: Aug. 7, 2013

(87) PCT Pub. No.: WO2012/097999
PCT Pub. Date: Jul. 26, 2012

(65) Prior Publication Data
US 2013/0306402 A1 Nov. 21, 2013

(30) Foreign Application Priority Data
Jan. 19, 2011 (DE) .......................... 10 2011 008 922

(51) Int. Cl.
*F02K 1/00* (2006.01)
*F02K 1/82* (2006.01)
*F01D 25/30* (2006.01)
*F02C 7/24* (2006.01)

(52) U.S. Cl.
CPC ............... *F02C 7/24* (2013.01); *F05D 2260/96* (2013.01); *F02K 1/827* (2013.01); *F01D 25/30* (2013.01); *F02K 1/00* (2013.01)
USPC .......................................... 181/292; 181/213

(58) Field of Classification Search
CPC ........................ B64D 33/06; B64D 2033/0203; F02K 1/827; F02C 7/045; G10K 1/172
USPC .................................................... 181/213, 292
See application file for complete search history.

(56) References Cited

U.S. PATENT DOCUMENTS 1,972,592 A * 9/1934 Jacobson ....................... 181/292
2,910,153 A * 10/1959 Campbell ...................... 428/589
(Continued)

FOREIGN PATENT DOCUMENTS

| DE | 102004053383 | 5/2006 |
| EP | 0636780 | 2/1995 |
| EP | 1391597 | 2/2004 |

OTHER PUBLICATIONS

English translation of International Search Report and Written Opinion from counterpart PCT App No. PCT/EP2012/000244
(Continued)

*Primary Examiner* — Jeremy Luks
(74) *Attorney, Agent, or Firm* — Timothy J. Klima; Shuttleworth & Ingersoll, PLC

(57) ABSTRACT

The present invention relates to a method for manufacturing a body provided with a honeycomb structure, which body is designed preferably axis-symmetrical, with sheet-metal parts being provided with a wave-like structuring by means of a forming process and formed to ring elements, with the sheet-metal parts being shaped and designed in a substantially identical way as regards their structuring, with adjacent sheet-metal parts being arranged offset to one another and then joined together to form the honeycomb structure.

13 Claims, 6 Drawing Sheets

(56) References Cited

U.S. PATENT DOCUMENTS

Figure 1:
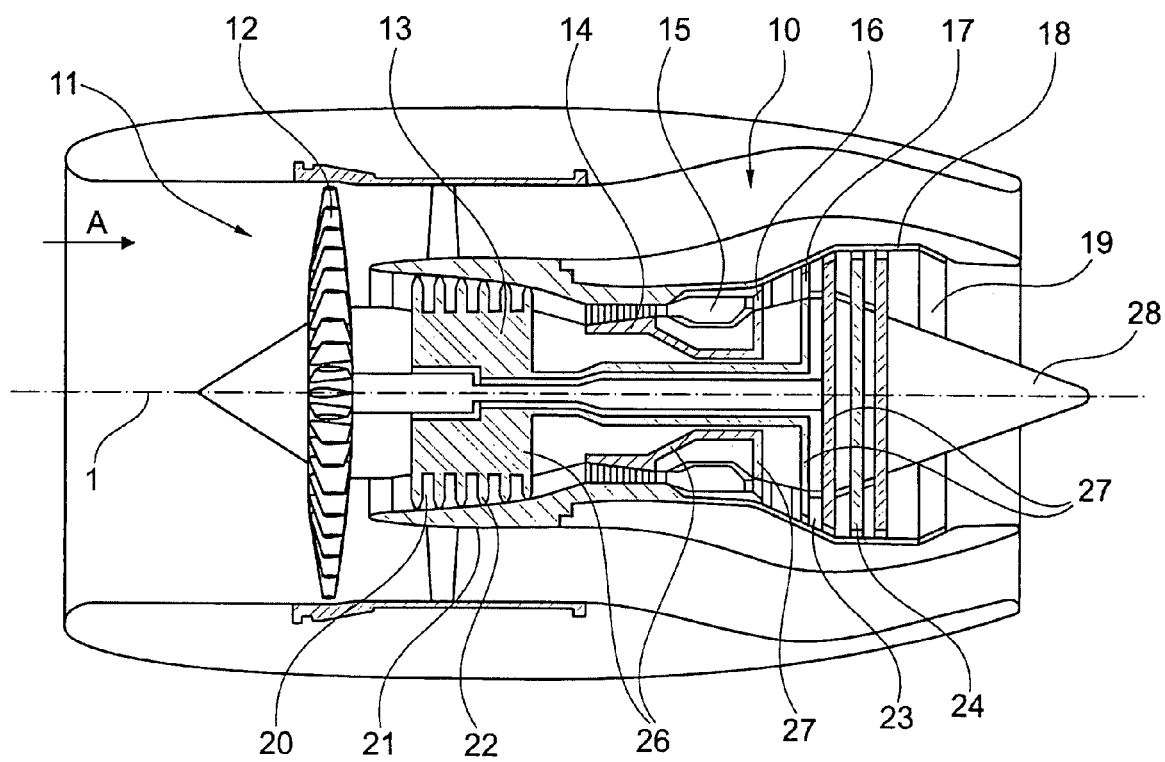

| | | | |
|---|---|---|---|
| 3,072,225 A * | 1/1963 | Long et al. | 428/593 |
| 4,064,961 A | 12/1977 | Tseo | |
| 4,135,851 A * | 1/1979 | Bill et al. | 415/173.3 |
| 4,137,992 A * | 2/1979 | Herman | 181/213 |
| 4,301,890 A * | 11/1981 | Zalas | 181/286 |
| 4,471,013 A * | 9/1984 | Welzen | 428/116 |
| 4,618,152 A * | 10/1986 | Campbell | 277/414 |
| 4,642,993 A * | 2/1987 | Sweet | 60/752 |
| 4,826,106 A * | 5/1989 | Anderson | 244/117 R |
| 5,013,613 A | 5/1991 | Gojny et al. | |
| 5,096,376 A * | 3/1992 | Mason et al. | 415/173.5 |
| 5,116,688 A * | 5/1992 | Minamida et al. | 428/582 |
| 5,126,183 A * | 6/1992 | Smith, II | 428/118 |
| 5,310,586 A * | 5/1994 | Mullen | 428/34.1 |
| 5,431,980 A * | 7/1995 | McCarthy | 428/116 |
| 5,437,936 A * | 8/1995 | Johnson | 428/593 |
| 7,267,297 B2 * | 9/2007 | Campbell et al. | 244/1 N |
| 8,302,733 B2 | 11/2012 | Peiffer et al. | |
| 2005/0006529 A1 * | 1/2005 | Moe et al. | 244/134 D |
| 2007/0256889 A1 | 11/2007 | Yu et al. | |
| 2010/0212998 A1 | 8/2010 | Valleroy et al. | |

OTHER PUBLICATIONS

German Search Report dated Aug. 4, 2011 from counterpart application.

International Search Report dated Jul. 20, 2012 from counterpart application.

* cited by examiner

METHOD FOR THE PRODUCTION OF A SOUND ABSORBER, ESPECIALLY FOR A GAS TURBINE EXHAUST CONE

This application is the National Phase of International Application PCT/EP2012/000244 filed Jan. 19, 2012 which designated the U.S.

This application claims priority to German Patent Application No. DE102011008922.5 filed Jan. 19, 2011, which application is incorporated by reference herein.

This invention relates to a method for manufacturing a sound absorber, in particular for a gas-turbine exhaust cone arranged at the outflow area of a gas turbine.

Gas turbines for aircraft engines require noise abatement. For this purpose, various measures are known to minimize the noise of the gas stream exiting from an exhaust nozzle downstream of the turbine.

From the state of the art it is known to dampen the low frequencies occurring in particular on engines with lean combustion. Noise dampening is here accomplished by means of a Helmholtz resonator and the $\lambda/4$ principle. It is known to provide such a Helmholtz resonator in the inflow area of the exhaust cone, while the downstream end area of the exhaust cone is merely conceived as geometric body. Known Helmholtz resonators are here provided as a system of radial walls and inner cylindrical ducts and dimensioned in dependence of the frequencies.

The known designs disadvantageously require reinforcing elements as they are heavily mechanically loaded in terms of the gas temperatures occurring. Also attributable to different walls and stiffening elements, the resultant design features a relatively high weight. Additionally, manufacture thereof requires high effort and investment. Manufacturing costs are still further increased by internal acoustic measures (perforations or similar). Further, the axial length of such a resonator requires considerable installation space, adding to the weight of the arrangement.

An acoustic absorber is known from DE 10 2004 053 383 A1 in which three-dimensional honeycomb structures are formed by folding flat semi-finished materials. This procedure is complex and cost-intensive, while not allowing optimum structures to be provided for sound absorption.

In a broad aspect, the present invention provides a gas-turbine exhaust cone of the type specified at the beginning which, while being simply designed and having a high dampening effect, can be manufactured cost-effectively and is characterized by low weight. Furthermore the invention provides a method for manufacturing a gas-turbine exhaust cone provided with a honeycomb structure.

It is a particular object of the present invention to provide solution to the above problematics by a combination of the features of the independent Claims. Further advantageous embodiments of the present invention become apparent from the sub-claims.

In accordance with the invention, a method is thus created for manufacturing a sound absorber, in particular for a gas-turbine exhaust cone, the outer wall of which is provided with a plurality of recesses. These recesses can be designed in a wide variety of shapes, and it is possible to provide a large number of small recesses. Furthermore, larger recesses can also be provided. This depends on the sound frequency to be absorbed.

The acoustic absorber created in the sound absorber (gas-turbine exhaust cone) in accordance with the invention furthermore provides that a honeycomb-structured layer that extends along the inside of the outer wall is arranged on the inside of the outer wall of the gas-turbine exhaust cone. Furthermore, it is provided in accordance with the invention that an inner wall connected to the honeycomb-structured layer extends substantially parallel to the outer wall. Hence the gas-turbine exhaust cone (acoustic absorber) is designed double-walled.

In accordance with the invention, the honeycomb-structured layer is made up of structured ring elements which are each arranged parallel to a plane extending vertically to a central axis of the gas turbine. The individual structured ring elements are connected to adjacent ring elements in order to form a honeycomb-structured layer having radial honeycombs.

A sound absorber is thus provided in accordance with the invention that is designed both cylindrical and in particular conical and that has a honeycomb-structured layer whose honeycombs are each radially aligned.

It is thus possible in accordance with the invention to create complex structures of acoustic absorbers, i.e. both cylindrical and conical or otherwise structured shapes of the honeycomb-structured layer. Furthermore, it is possible to design the radial length of the honeycombs selectively and to shape these honeycombs such that their cross-section remains substantially constant in the radial direction. This also makes it possible to provide very deep honeycombs extending over a considerable radial distance in an acoustic absorber of this type in accordance with the invention.

A further, substantial advantage of the embodiment in accordance with the invention is that the honeycomb-structured layer can be manufactured free of stresses, such that during operation, and in particular in the case of thermal stresses, the risk of cracking can be considerably reduced.

With the structure in accordance with the invention, it is furthermore and in particular possible to ensure optimization of acoustic absorption without having to alter the outer shape of the gas-turbine exhaust cone or of the acoustic absorber.

A further substantial advantage of the embodiment in accordance with the invention is that the honeycomb-structured layer can be manufactured from various materials, both metallic and non-metallic ones.

It is particularly favourable when, in accordance with the invention, the individual ring elements are provided with an identical structuring forming the honeycomb structure of the honeycomb-structured layer. This results in the advantage during manufacture that substantially identical ring elements can be used and can be manufactured by means of a single forming tool. The individual ring elements subsequently only need to be arranged offset to one another in the circumferential direction in order to form the honeycomb-structured layer.

In this connection, it must be pointed out that the "honeycomb structure" is a structure of the honeycomb type that provides the densest concentration of chambers or recesses in adjacent levels. The cross-section is not restricted to hexagonal structures, instead the structuring can also be designed wave-like or in another manner.

In a preferred embodiment of the invention, the ring elements are designed as shaped sheet-metal parts. For forming complex overall structures, for example a conical overall shape, adjacent ring elements are each provided with a different outer radius and/or inner radius.

In a particularly favourable embodiment of the invention, it is provided that the acoustic absorber/gas-turbine exhaust cone is provided with two or more honeycomb-structured layers which are placed one above the other in the radial direction and absorb different frequencies. As a result, noise dampening can be achieved both by Helmholtz resonators and according to the $\lambda/4$ principle.

With regard to the method in accordance with the invention for manufacturing the acoustic absorber or the gas-turbine exhaust cone, it is provided that the latter is designed preferably axis-symmetrical. Individual sheet-metal parts are shaped by means of a forming process to provide a wave-like or partial-honeycomb structure. The ring elements or partial-ring elements thereby obtained are here formed and designed in a substantially identical way as regards their structuring. Adjacent sheet-metal parts are arranged offset to one another and then joined together to form the honeycomb structure.

The individual sheet-metal parts can be cut to size either before or after they are formed, in order to have different dimensions for example in the radial direction and so form a conical body of the acoustic absorber, for example.

In accordance with the invention, it is possible to join together the individual formed and structured sheet-metal parts or ring elements by welding, bonding or other methods.

Figure 2:
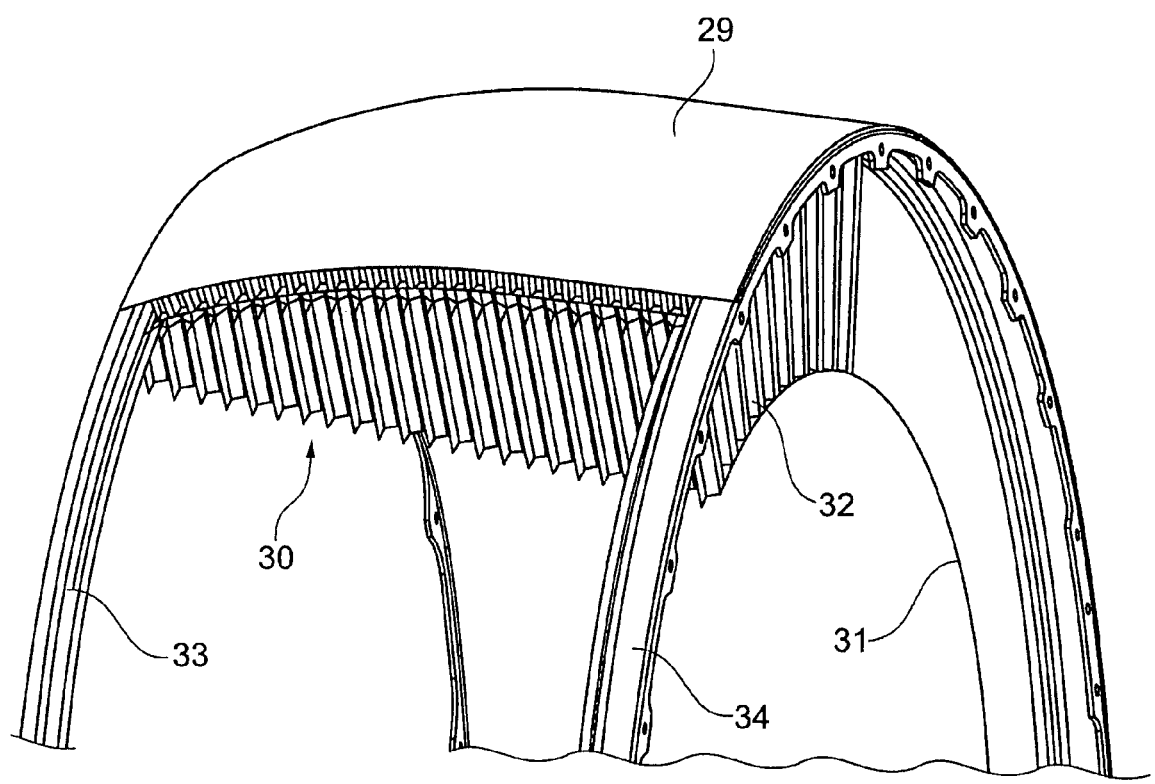
Figure 3:
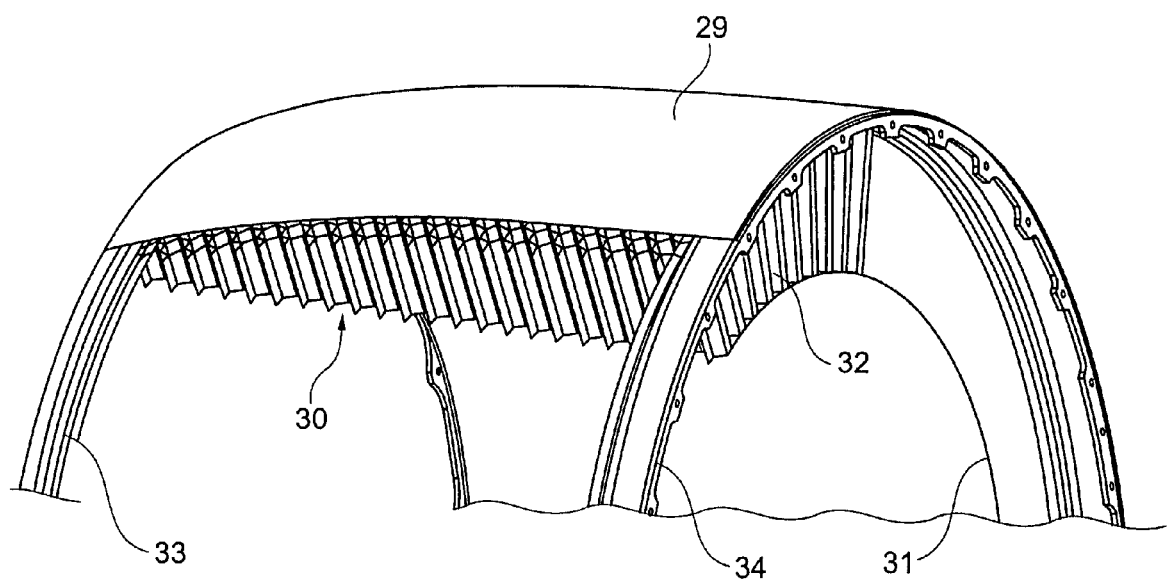
Figure 4:
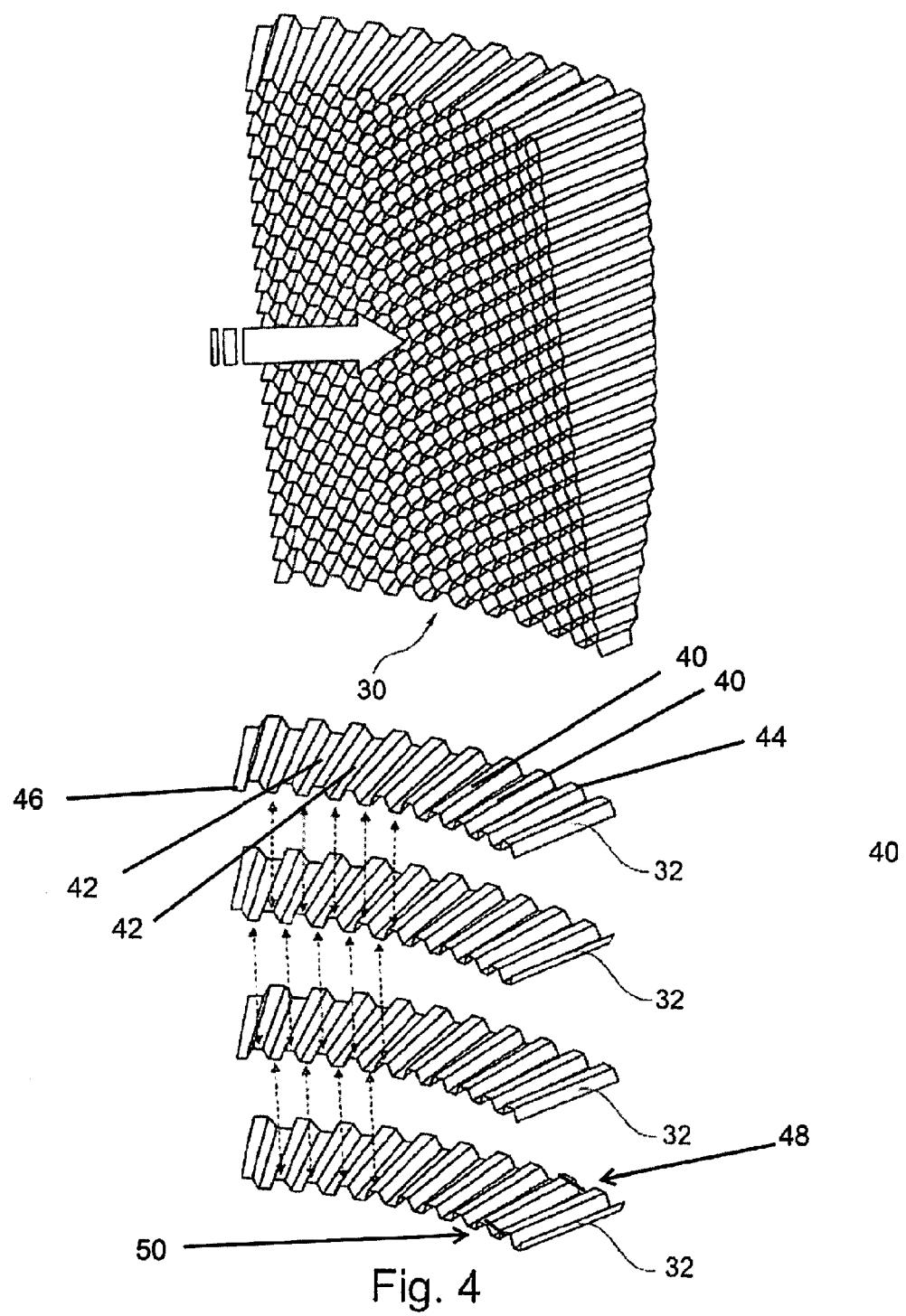
Figure 6:
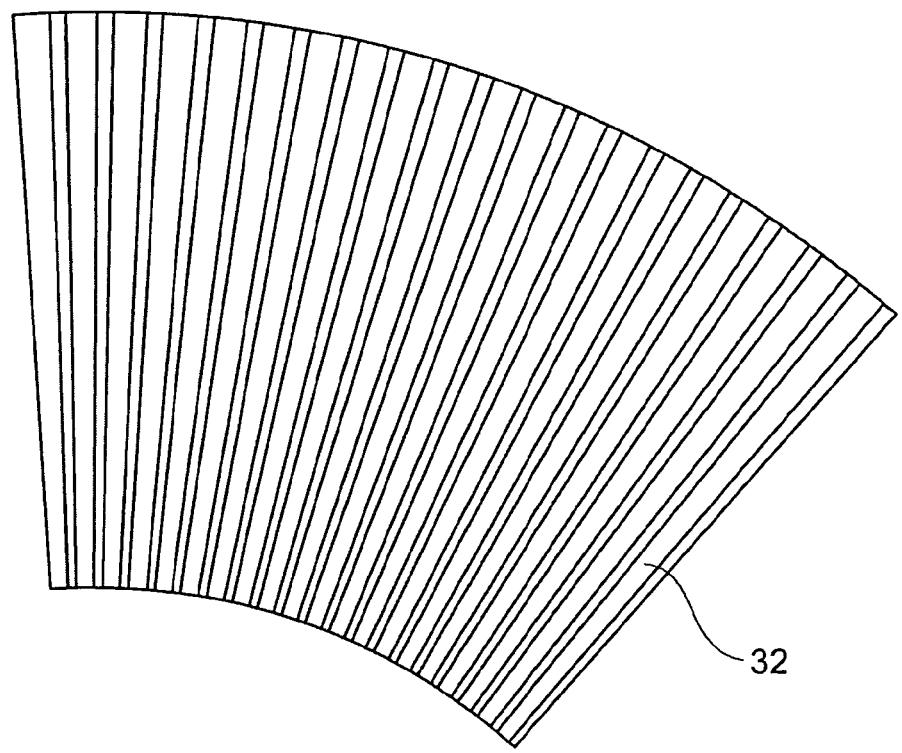
Figure 5:
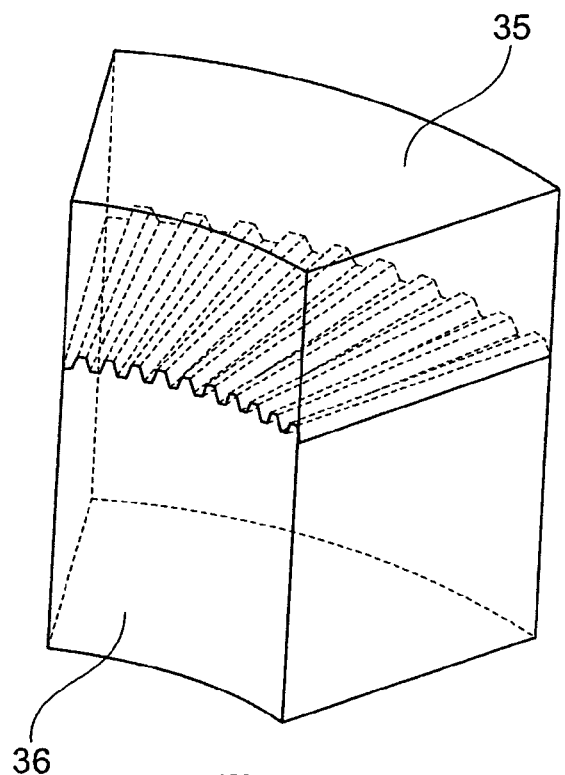
Figure 7:
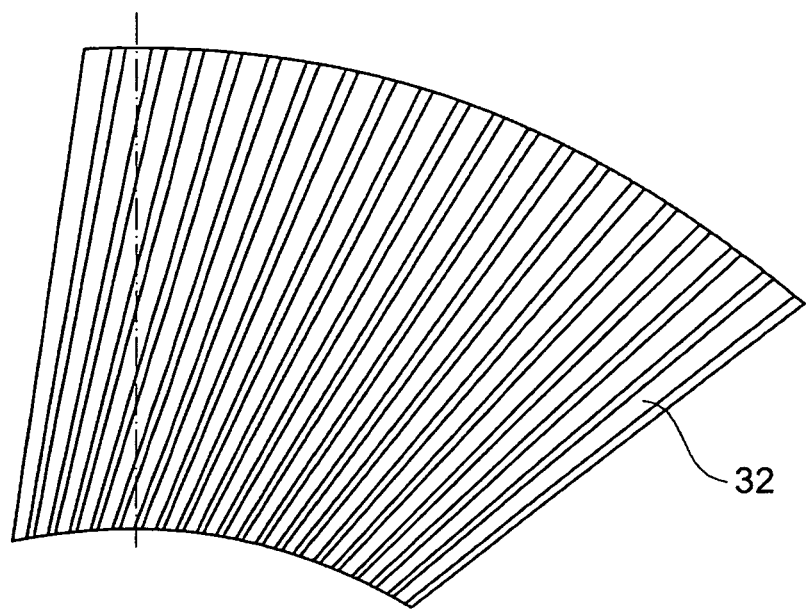
Figure 8:
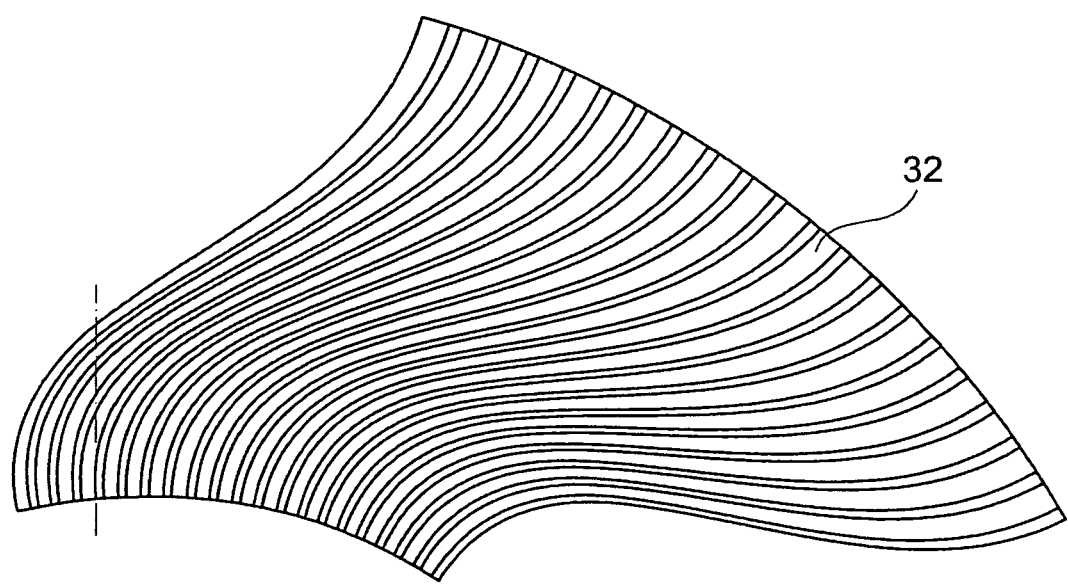

The present invention is described in the following in light of the accompanying drawing showing exemplary embodiments. In the drawing, FIG. 1 shows a schematic representation of a gas-turbine engine in accordance with the present invention, FIG. 2 shows a perspective partial view of a first exemplary embodiment of a gas-turbine exhaust cone with acoustic absorber in accordance with the present invention, FIG. 3 shows a view, similarly to FIG. 2, of a further exemplary embodiment, FIG. 4 shows a schematic representation of the design and the manufacture of the honeycomb-structured layer in accordance with the present invention, FIG. 5 shows a simplified representation of a forming tool to be used, FIGS. 6 to 8 show simplified representations of different structures of the ring elements for forming the honeycomb-structured layer.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 furthermore shows an exhaust cone 28 arranged downstream of the turbine, along which flows the exiting exhaust jet.

FIGS. 2 and 3 each show perspective partial views of differing exemplary embodiments of the exhaust cone in accordance with the invention. An outer wall 29 is provided here which features a plurality of recesses not shown in detail for sound ingress. An inner wall 31, which delimits an interior of the gas-turbine exhaust cone or of the acoustic absorber, extends substantially parallel to the outer wall 29.

At least one honeycomb-structured layer 30 is provided in the interspace between the outer wall 29 and the inner wall 31 and is made up of individual ring elements 32, as is described in the following.

In the exemplary embodiment of FIG. 2, a double-layered honeycomb-structured layer 30 is provided, which includes larger and longer honeycombs arranged radially on the inside and a thinner layer of smaller honeycombs provided radially outside of the inner layer and adjoining the outer wall 29.

FIG. 3 shows an exemplary embodiment with only one honeycomb-structured layer in analogeous representation as per FIG. 2.

FIGS. 2 and 3 each show a front flange 33 and a rear flange 34 used for mounting of the gas-turbine exhaust cone and for generating a stable overall structure, as is known from the state of the art.

FIG. 4 shows in an exemplary illustration the design of the honeycomb-structured layer 30 in accordance with the invention. It consists of individual ring elements 32 which can be designed as a partial ring or as a complete ring. The structuring of the individual ring elements 32 is identical. As shown, the structuring of each ring element includes peaks 40 and troughs 42 extending in a circumferential direction of the ring elements 32. A slight offset in the circumferential direction (relative to the overall structure of the gas-turbine exhaust cone and the basic engine axis or central axis 1) results in the honeycomb structure shown in the right-hand half of FIG. 4. It is possible by dimensioning of the respective radial lengths of the individual ring elements 32 to provide cylindrical, conical, spherical or other geometrical designs. To do so, either the individual ring elements 32 are trimmed in the radial direction after the forming process, for example by means of a laser cutting method, or different sheet-metal blanks are shaped to form the ring elements 32 by means of the forming tool still to be described (FIG. 5).

From the right-hand half of FIG. 4, it is in particular discernible that the honeycomb structure comprises individual honeycombs extending in the radial direction and having a substantially constant shape. It is obvious that the internal diameter of the honeycombs increases radially, as can be seen in FIG. 4, such that a pitch 48 between the peaks 40 and the troughs 42 of the structuring is greater at an outer radius 44 of the ring element 32 than a pitch 50 between the peaks 40 and the troughs 42 of the structuring at an inner radius 46.

The individual ring elements 32 can be joined together by welding, bonding, brazing or by another method.

FIG. 5 shows a schematic representation of a forming tool with an upper tool 35 and a lower tool 36. It is obvious that the entire forming tool can be designed either as a partial ring or as a closed ring. In conjunction with the illustration in FIG. 4, the result is that the individual ring elements 32 needed to make up a complex three-dimensional (for example conical) structure can be manufactured by means of a single forming tool.

FIGS. 6 to 8 each show different embodiments of the structuring and the resultant inner chambers of an individual ring element 32 of the honeycomb-structured layer 30. FIG. 6 shows a classic radial embodiment, while FIG. 7 shows an embodiment with angular offset and FIG. 8 a curved embodiment. It is therefore possible for example to vary the overall length of the available honeycombs of the honeycomb-structured layer 30 by a structure which is designed curved or angular (FIGS. 7 and 8).

LIST OF REFERENCE NUMERALS

1 Engine axis/central axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing/cowling
22 Compressor rotor blades
23 Stator vanes
24 Turbine blades
26 Compressor drum or disk
27 Turbine rotor hub
28 Exhaust cone
29 Outer wall
30 Honeycomb-structured layer
31 Inner wall
32 Ring element
33 Front flange
34 Rear flange
35 Upper tool
36 Lower tool

What is claimed is:

1. A method for manufacturing a body including a honeycomb structure, comprising:
   forming with a forming process a plurality of substantially identically shaped sheet-metal parts in the form of circular rings having a first radius and a second radius radially outwardly of the first radius, the sheet-metal parts having a wave structuring having peaks and troughs extending in a circumferential direction of the sheet-metal parts, a pitch between the peaks and troughs being greater at the second radius than the first radius, a thickness of each sheet-metal part being substantially identical from the first radius to the second radius;
   arranging the plurality of sheet-metal parts adjacent to one another and radially offset to one another;
   joining the adjacent sheet-metal parts together to form the honeycomb structure;
   wherein the wave structuring of the circular ring sheet-metal parts is curved, in a plane extending normally to a central axis of the body and between the first radius and the second radius, to be non-parallel to a radial direction.

2. The method of claim 1, wherein the sheet-metal parts are formed with a structuring extending substantially in a radial direction.

3. The method of claim 1, wherein adjacent sheet-metal parts are provided with different radial dimensions to form a conical shape of the body when joined together.

4. The method of claim 1, wherein the sheet-metal parts are joined together by at least one chosen from welding and bonding.

5. A gas-turbine exhaust cone comprising:
   an outer wall, which includes a plurality of recesses,
   a honeycomb-structured layer arranged on an inside of the outer wall and extending along the inside of the outer wall, and
   an inner wall connected to the honeycomb-structured layer and extending substantially parallel to the outer wall, the honeycomb-structured layer including a plurality of structured ring elements, each of the plurality of structured ring elements including a first radius and a second radius radially outwardly of the first radius and each arranged parallel to a plane extending normally to a central axis, each of the plurality of structured ring elements connected to adjacent structured ring elements to form the honeycomb-structured layer having honeycombs extending between the first radius and the second radius;
   each of the structured ring elements having a wave structuring having peaks and troughs extending in a circumferential direction of the structured ring elements, a pitch between the peaks and troughs being greater at the second radius than the first radius, a thickness of each structured ring element being substantially identical from the first radius to the second radius;
   wherein the structuring of the structured ring elements is provided at an angle greater than 0° to a radial direction of the exhaust cone.

6. The gas-turbine exhaust cone in accordance with claim 5, wherein the ring elements are each provided with an identical structuring forming the honeycomb structure of the honeycomb-structured layer.

7. The gas-turbine exhaust cone in accordance with claim 5, wherein the ring elements are shaped sheet-metal parts.

8. The gas-turbine exhaust cone in accordance with claim 5, wherein certain ones of the adjacent ring elements are provided with at least one chosen from a different outer radius and a different inner radius to form a conical overall shape of the honeycomb-structured layer.

9. The gas-turbine exhaust cone in accordance with claim 5, wherein adjacent ring elements are arranged offset to one another in a circumferential direction to form the honeycomb-structured layer.

10. A gas-turbine exhaust cone comprising:
    an outer wall, which includes a plurality of recesses,
    a honeycomb-structured layer arranged on an inside of the outer wall and extending along the inside of the outer wall, and
    an inner wall connected to the honeycomb-structured layer and extending substantially parallel to the outer wall,
    the honeycomb-structured layer including a plurality of structured ring elements, each of the plurality of structured ring elements including a first radius and a second radius radially outwardly of the first radius and each arranged parallel to a plane extending normally to a central axis, each of the plurality of structured ring elements connected to adjacent structured ring elements to form the honeycomb-structured layer having honeycombs extending between the first radius and the second radius;
    each of the structured ring elements having a wave structuring having peaks and troughs extending in a circumferential direction of the structured ring elements, a pitch between the peaks and troughs being greater at the second radius than the first radius, a thickness of each structured ring element being substantially identical from the first radius to the second radius;
    wherein the wave structuring of the structured ring elements is curved, in the plane extending normally to the central axis and between the first radius and the second radius, to be non-parallel to a radial direction.

11. The gas-turbine exhaust cone in accordance with claim 5, wherein the first radius is an innermost radius of the structured ring elements and the second radius is an outermost radius of the structured ring elements.

12. A method for manufacturing a body including a honeycomb structure, comprising:
    forming with a forming process a plurality of substantially identically shaped sheet-metal parts in the form of circular rings having a first radius and a second radius radially outwardly of the first radius, the sheet-metal parts having a wave structuring having peaks and troughs extending in a circumferential direction of the sheet-metal parts, a pitch between the peaks and troughs being greater at the second radius than the first radius, a thickness of each sheet-metal part being substantially identical from the first radius to the second radius;
    arranging the plurality of sheet-metal parts adjacent to one another and radially offset to one another;
    joining the adjacent sheet-metal parts together to form the honeycomb structure;
    wherein the sheet-metal parts are formed with a structuring extending at an angle greater than 0° to a radial direction.

13. The method of claim 1, wherein the first radius is an innermost radius of the sheet-metal parts and the second radius is an outermost radius of the sheet-metal parts.

* * * * *